UNITED STATES PATENT OFFICE.

MARK C. RICH, OF BELLEFOURCHE, SOUTH DAKOTA, ASSIGNOR, BY MESNE ASSIGNMENTS, TO THE AMERICAN ALFALFA PRODUCTS CO., OF DENVER, COLORADO, A CORPORATION OF COLORADO.

ALFALFA PRODUCTS.

1,195,154.  Specification of Letters Patent.  Patented Aug. 15, 1916.

No Drawing.  Application filed May 17, 1915.  Serial No. 28,576.

*To all whom it may concern:*

Be it known that I, MARK C. RICH, a resident of Bellefourche, in the county of Butte and State of South Dakota, have invented certain new and useful Improvements in Alfalfa Products, of which the following is a full, clear, and exact description.

The invention relates to alfalfa products for use in beverages for human consumption.

In the manufacture of alfalfa products for use in beverages for human consumption, it has been found desirable to provide a product which is readily soluble in water and which is palatable and contains the food and medicinal properties of the alfalfa.

The object of the invention is to provide such a product for use in making beverages, such as coffee substitute.

The invention consists in the method of manufacturing alfalfa products and the product hereinafter set forth and more particularly defined by claims at the conclusion hereof.

Alfalfa is a lanuginous leaf, covered with very fine soft, woolly hair and when it is young, the secretions cause impurities to adhere to the leaves.

In the manufacture of alfalfa extract, according to the present invention, the alfalfa is harvested or cut when it is about 8 to 12 inches high and about 14 days old. In this condition, the alfalfa is free from woody or hard fiber, as compared with its condition when it is from 30 to 35 days old, and from 20 to 24 inches high. The alfalfa is cut about 4 inches above the ground, to leave about 4 inches of stubble. As it is harvested, it is deposited in small bunches of about a bushel each, on the stubble, where it is left for about 24 hours and during that period the air will circulate through the bunches and the alfalfa leaves will wilt and the stems will be partially dried, so that about half of the inherent moisture in the alfalfa will be removed. This treatment of alfalfa thus harvested sweetens the odor of and partially cures the alfalfa. Next, the alfalfa is placed in loose layers or on racks, in a steel constructed room, and subjected to artificial heat of 150° Fahrenheit for about 3 to 7 days. This treatment prevents bleaching and causes the alfalfa to retain its desirable flavor and to remain light green in color. The period in which the alfalfa is subjected to artificial heat is varied according to the amount of moisture in the alfalfa. Next, the alfalfa is cut into small pieces from $\frac{1}{8}$ inch to $\frac{1}{2}$ inch in length. Next, the cut alfalfa is mixed with sorghum of a sufficient quantity to glaze every particle of the alfalfa. Next, it is roasted, the temperature being carried to the point of browning and thoroughly caramelizing the sorghum. Any saccharine material, such as granulated sugar, molasses or glucose, may be used, but sorghum is preferred. In practice, it has been found that slight carbonization does not injure the material, but brings out the flavor. The roasted product is then boiled in a percolator at a temperature of about 212° Fahrenheit. The temperature is afterward reduced to obtain a clear solution, which is ready for evaporation without filtration. Percolation permits control of the extraction whereby the product may be given different strengths and qualities. The aqueous extract from roasted alfalfa as described above yields from 25 to 40 per cent. of soluble extractive matter to which is added sufficient commercial gelatin, to produce a firm and quite solid body, which is then ready for use. This extract in flavor resembles that of roasted coffee. To solidify the product, a clear aqueous solution is concentrated by evaporation in a vacuum tank with great care to prevent loss of volatile matter other than water. A temperature of 140° to 160° Fahrenheit in the vacuum pan has been found to be satisfactory in the final operation. This operation is continued until the aqueous product is concentrated to a point where it contains about 30 per cent. solids in the solution. Next, the extract is dried on trays in a vacuum chamber or on a rotary plane. In this direct treatment, the moisture is reduced to a small percentage and the temperature is regulated so that overheating does not occur. At the end of this direct operation, the temperature may be lowered to permit the heat of the mass to drive off the residue of water. The product is then removed from the pan and coarsely granulated or ground and is ready for packing. This product may be readily dissolved in water, possesses a pleasant flavor and does not contain any tannins, caffein or alkaloids which are injurious.

The invention is not to be understood as restricted to the precise practice hereinbefore set forth, since it may be modified within the scope of the appended claims, without departing from the spirit and scope of the invention.

Having thus described my invention, what I claim as new, and desire to secure by Letters Patent is:

1. That improvement which consists in mixing alfalfa which is naturally free from woody fiber with a saccharine material, heating the mixture sufficiently to caramelize said material, and then making an extract from the product.

2. That improvement which consists in mixing alfalfa which is naturally free from woody fiber with a saccharine material, heating the mixture sufficiently to caramelize said material and then boiling the caramelized product.

3. That improvement which consists in mixing alfalfa which is naturally free from woody fiber with a saccharine material, heating the mixture sufficiently to caramelize said material, and then making an extract from the product and mixing the extract with gelatin.

4. That improvement which consists in mixing alfalfa which is naturally free from woody fiber with a saccharine material, heating the mixture sufficiently to caramelize said material, then making an extract of the product and then concentrating the product by evaporation.

5. That improvement which consists in mixing alfalfa which is naturally free from woody fiber and which has been washed to remove the dry secretions and impurities therefrom with a saccharine material, heating the mixture sufficiently to caramelize said material, and then making an extract from the caramelized product.

6. An alfalfa product containing roasted alfalfa which is naturally free from woody fiber, and a caramelized saccharine material.

7. An alfalfa product consisting of an extract of roasted alfalfa which is naturally free from woody fiber and a slightly carbonized or caramelized saccharine material.

8. An alfalfa product containing the residue of an extract of alfalfa and caramelized saccharine material from which the aqueous material has been removed.

MARK C. RICH.

Witnesses:
FRED GERLACH,
KATHARINE GERLACH.

Copies of this patent may be obtained for five cents each, by addressing the "Commissioner of Patents, Washington, D. C."